United States Patent [19]
Dorrell

[11] Patent Number: 5,234,249
[45] Date of Patent: Aug. 10, 1993

[54] AIR DRAG REDUCING TAILGATE APPARATUS

[76] Inventor: Jay L. Dorrell, 110 Hunters Ct., Lumberton, Tex. 77656

[21] Appl. No.: 978,396

[22] Filed: Nov. 18, 1992

[51] Int. Cl.⁵ .............................. B62D 25/00
[52] U.S. Cl. ......................... 296/180.1; 296/57.1
[58] Field of Search ............ 296/180.1, 180.3, 50, 296/57.1

[56] References Cited

U.S. PATENT DOCUMENTS

| | | | |
|---|---|---|---|
| 4,475,759 | 10/1984 | Wine | 296/180.1 |
| 4,867,499 | 9/1989 | Stephan et al. | 296/50 |
| 4,884,838 | 12/1989 | Slater | 296/180.1 |
| 4,902,066 | 2/1990 | Norman | 296/57.1 |
| 5,069,498 | 12/1991 | Benchoff | 296/180.1 |

Primary Examiner—Robert R. Song
Attorney, Agent, or Firm—Bush, Moseley & Riddle

[57] ABSTRACT

An apparatus is disclosed for increasing the fuel economy of motor vehicles having a cargo carrying bed with a movable tailgate panel. The apparatus adjustably positions the tailgate panel between the upstanding closed position and the horizontal loading position automatically in response to the force of wind or air pressure acting on the tailgate panel to reduce the air drag resistance on the motor vehicle. The apparatus includes a suitable biasing means, such as a mechanical spring or a conventional door closure, to adjustably position the tailgate.

4 Claims, 1 Drawing Sheet

U.S. Patent     Aug. 10, 1993     5,234,249
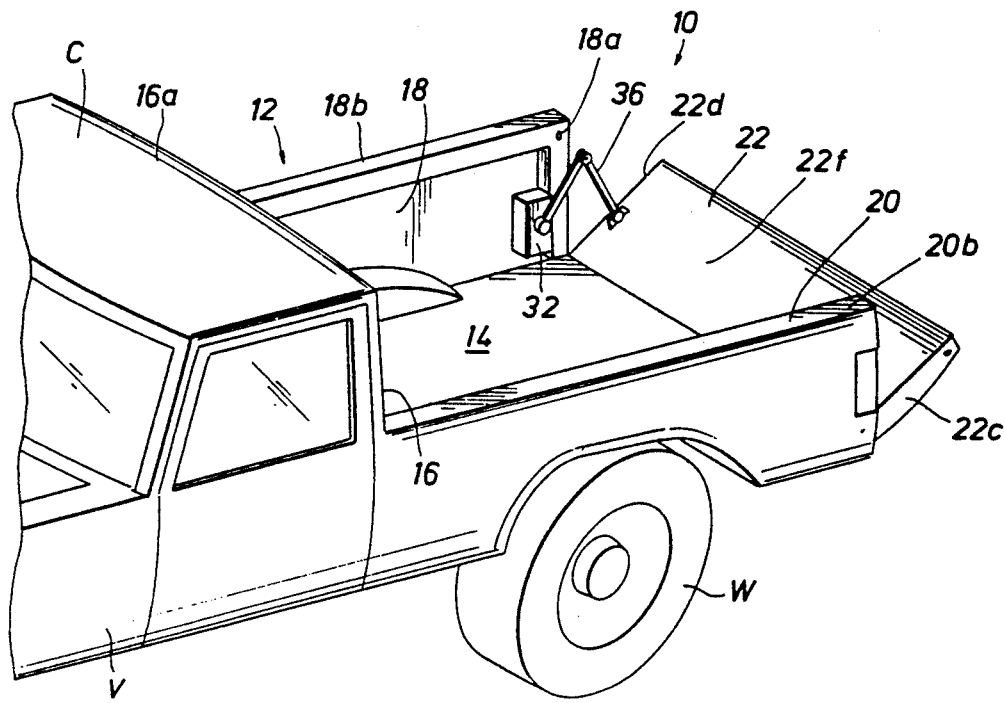
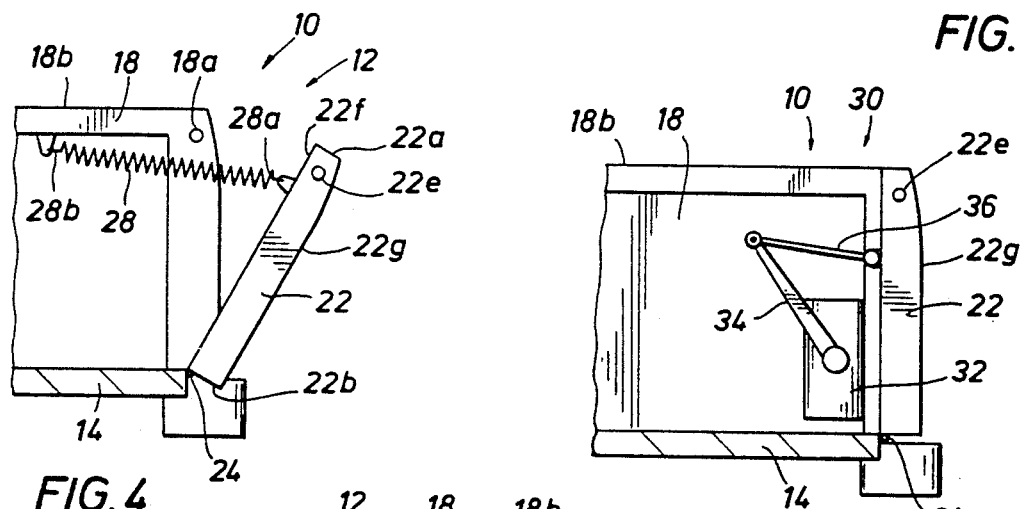
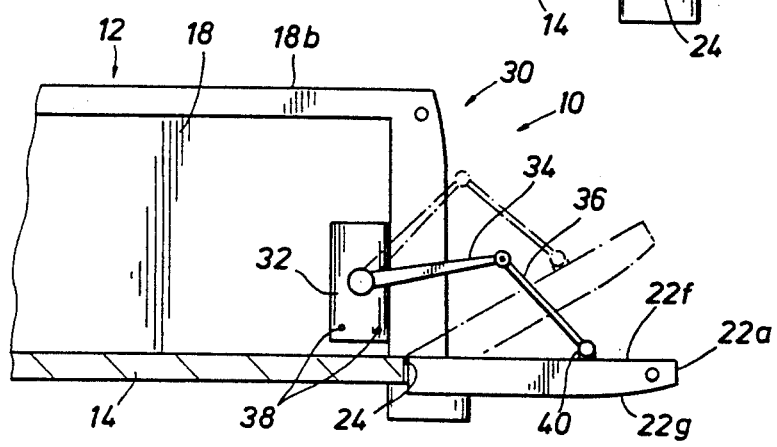

AIR DRAG REDUCING TAILGATE APPARATUS

CROSS-REFERENCE TO RELATED APPLICATION

None

BACKGROUND OF THE INVENTION (1) Field of the Invention

The present invention relates generally to the field of an apparatus for increasing fuel efficiency of motor vehicles and more particularly to a tailgate apparatus for reducing wind or air resistance drag of the tailgate apparatus on the motor vehicle to enhance fuel economy.

(2) Description of the Related Art

The problem of increased fuel consumption of a motor vehicle resulting from air resistance or drag at increased speed is well know. The problem has been addressed in a number of ways or approaches on the prior art, but none of the offered solutions has been widely accepted.

U.S. Pat. No. 4,506,870 to Penn is entitled "combined Truck Bed Storage Compartment And Spoiler" and discloses a conventional pickup truck motor vehicle having a cargo carrying compartment or bed having a horizontal floor, opposing vertical side walls and a pivoting or swingable rear panel or tailgate. The disclosed apparatus includes a bed plate or panel and a top plate or panel. The top panel is pivotally attached to the bed plate to enable placement in either a horizontal flat portion to enable full cargo or load carrying capacity or an inclined compartment forming position relative to the tailgate. When in the inclined position the top panel also serves as an air drag reducer or air spoiler for the closed tailgate panel.

Deaver et al. U.S. Pat. No. 4,863,213 discloses the use of an aerodynamic spoiler mounted on the top edge of a closed tailgate to reduce draft or wind resistance.

U.S. Pat. No. Slater 4,884,383 is entitled "Combined Air Foil and Loading Ramp For Pickup Truck". The loading ramp panel is attached to the top edge of a conventional tailgate panel and is positioned within the confines of the bed when the tailgate is in the upright closed position to form an angled air foil.

U.S. Pat. No. 4,585,265 to Mader discloses a pick up truck cargo bed tailgate arrangement having a tailgate movable to three positions. In addition to the normal horizontal or open position and the closed or upright cargo carrying positions, the tailgate panel may be positioned (FIG. 4), horizontally by swinging about an upper edge pivot axis and sliding forward in the cargo bed to assume a parallel horizontal position spaced from the bed floor to reduce air resistance.

Disclosed in Austin U.S. Pat. No. 4,652,035 is a tailgate construction or mounting bracket apparatus that also operates to position the tailgate panel horizontally above the cargo bed.

Morgan U.S. Pat. No. 4,136,905 discloses three embodiments of modified tailgate construction to minimize the air brake effect when in the closed or upright position. The first embodiment (FIGS. 1-4) provides a mesh screen tailgate panel to provide for air passage through the closed tailgate to reduce air drag. A separate thin cover plate may be installed if desired to contain a particular cargo. The second disclosed embodiment (FIGS. 5-8) employs a movable shutter arrangement which may be placed and secured in the open position to attain the same effect. I the third disclosed embodiment (FIGS. 9-10), the tailgate panel is provided with a screened window or cutout for providing an air passage or vent and having a pivoting door that may be locked in the open or closed position.

U.S. Pat. No. 4,902,066 to Norman is entitled "Directional Flow Tailgate". The modified tailgate is formed with angle slats to enhance drive vision and allow airflow through the tailgate.

The Smith U.S. Pat. No 4,372,601 is entitled "Air Drag Reducing Tailgate". The disclosed tailgate is mounted so it folds or rotates flat into the cargo bed to eliminate the unsafe condition that exists when the tailgate extends outside the body of the vehicle in the usual open position.

U.S. Pat. No. 4,475,759 to Wine discloses a tailgate that may be positioned and secured at a plurality of streamlined angular positions to minimize air draft using a top tailgate pivot.

Benchoff U.S. Pat. No. 5,069,498 discloses a telescoping panel that may be positioned to form a tapered or angled air foil located in the truck bed.

Voehringer U.S. Pat. No. 3,306,655 discloses a tailgate actuator for use on a station wagon vehicle. The actuator includes a hydraulically actuated cylinder powered by an electrically driven hydraulic pump to move the tailgate between the open and closed positions.

SUMMARY OF THE INVENTION

The apparatus of the present invention provides an air drag reducing tailgate apparatus that automatically positions the tailgate panel in response to the air drag to enhance fuel economy. The conventional tailgate panel is provided with a range of pivoting movement between the closed or upright position and the horizontal or loading position. The apparatus of the present invention provides a biasing or urging means for normally maintaining the tailgate panel in the upright position during vehicle movement, but which biasing means adjustably positions the tailgate panel automatically in response to the air pressure action on that panel to enable movement toward the horizontal position to reduce air drag resistance.

An object of the present invention is to provide a new and improved air drag reducing tailgate apparatus.

Another object of the present invention is to provide a new and improved air drag reducing tailgate apparatus that may be conveniently installed on existing vehicles.

Yet another object of the present invention is to provide a tailgate apparatus that automatically positions the tailgate to minimize air resistance.

BRIEF DESCRIPTION OF THE DRAWINGS

FIG. 1 is a view of a pickup truck type motor vehicle having an open top cargo bed with a movable tailgate panel operated in accordance with the present invention.

FIG. 2 is a side view, partially in section, illustrating the apparatus of the present invention with the tailgate panel in the closed or upright position.

FIG. 3 is a side view, partially in section, of the cargo bed and movable tailgate panel illustrating the closed or horizontal position and the range of enabled movement between the upright position.

FIG. 4 is a view similar to FIGS. 2 and 3, of another form of the present invention.

DESCRIPTION OF THE PREFERRED EMBODIMENT

The apparatus of the present invention, generally designated 10 in the FIGS. has the useful purpose or utility of reducing fuel consumption for motor vehicles. This useful purpose not only enhances the fuel efficiency of operation of the motor vehicle to the benefit of the owner or user, but also benefits the public in helping to reduce the amount of vehicle engine emissions or "smog" discharged into the environment.

For purposes of providing a full and complete written disclosure, the present invention will be described and illustrated in the context of an open top box or cargo carrying bed of a powered pickup truck type of motor vehicle V. Those skilled in the art will immediately appreciate that the use of the present invention is not limited in use to any specific type or form of open top cargo bed motor or mobile vehicle V. In the present context a motor vehicle V shall be broadly construed to include or cover any powered (truck) or unpowered (trailer) mobile vehicle used for transporting a desired cargo in or on an open top bed structure. The particular type or form of motor, engine or power plant employed to propel or pull the motor vehicle V, such as but not limited to diesel gasoline, electric or combinations thereon, for effecting the desired cargo movement by the motor vehicle employing the present invention for which fuel efficiency is increased should also not be considered as limiting the scope of the present invention.

As used herein the term "pickup" refers to a broad category of small self propelled trucks V having open top box cargo carrying beds mounted thereon. Also as used herein, the rear, or end closure of the open top cargo box or bed is referred to as the "tailgate". Open top cargo beds for mobile vehicles are recognized to have poor aerodynamic characteristics or qualities with the closed tailgate significantly contributing to the air resistance drag. As the forward velocity or travel speed with which the cargo box or bed is moved increases the air drag also increases. Such drag is created by the air pressure buildup on the front side of the upstanding closed tailgate panel as well as the reduced or lowered air pressure acting on the back side of the tailgate panel.

A conventional self propelled pickup truck type of motor vehicle V is illustrated in FIG. 1. Preferably, the pickup truck V is powered by a conventional gasoline internal combustion engine (not illustrated) for rotating the wheels W that operably support the pickup truck V and to provide vehicle movement in the usual manner. Such pickup trucks V are commercially available in the new condition or original equipment manufacturer (O.E.M.) items from a number of manufacturers or their distributor and in the used condition from an even larger number of sources. The present invention may be usefully employed on new and used pickup trucks V from most suppliers or manufacturers and should not be considered as limited to any particular manufacture or model. While it is contemplated that the apparatus of the present invention will be commercialized in the after market to the pickup truck owner and user, the present invention may be installed by the manufacturer as O.E.M. equipment if desired.

As illustrated in FIG. 1, the pickup truck V includes a conventional forward facing enclosed driver cab C in which the driver or operator sits to drive or operate the truck in the usual known manner. The relative terms front and rear will be used to designate the positioning location on the pick up truck V while forward and reverse will be used to describe the travel direction of the vehicle or pickup truck V. A conventional open top cargo or load carrying bed structure or means 12 is secured or mounted on the pickup truck V to the rear of the cab C. The cargo carrying bed means 12 includes a floor or cargo support panel 14, a fixed upstanding front wall or panel 16, a pair of upstanding side wall panels 18 and 20 and a movable tailgate closure wall panel 22. The front panel 16 is disposed adjacent the rear of the cab C while the tailgate panel 22 is disposed adjacent the rear of the pickup truck V. The front panel 16 may be formed either by the back surface of the cab C or as a separate panel structure. The generally planar rectangular shaped cargo floor or load support panel 14 extends between the front panel 16 and the tailgate panel 22 and is fixedly mounted substantially horizontally on the pickup truck V to receive, support and carry the desired cargo (not illustrated). The front wall panel 16 and parallel upstanding side wall panels 18 and 20 are disposed about the periphery edges of the cargo floor support panel 14 in a fixed surrounding or enclosing relationship to retain the desired cargo positioned and supported on the carrying panel. The type of desired cargo carried or loaded in the open top bed structure 12 is at the option of the pickup owner or user and forms no part of and is outside the scope of the present invention.

The movable tailgate closure panel 22 also extends substantially continuously between the side walls 18 and 22 at the rear of the pickup truck V to assist in forming the cargo surrounding open top cargo bed structure 12. The tailgate panel 22 is generally rectangular in configuration having a top edge 22a, a bottom edge 22b and generally parallel side edges 22c and 22d. The tailgate panel 22 forms a substantially planar or flat front wall surface 22f and a corresponding rear or back wall surface 22g. The tailgate closure panel 22 is movable to and from a closed or substantially vertically upstanding position (FIG. 2) for co-acting with the upstanding side walls 18 and 20 and the front wall panel 16 to retain the desired cargo on the cargo carrying floor panel 14 and a loading or open substantially horizontal position (FIG. 3) to enable convenient loading, placement or removal of the cargo on the cargo carrying floor panel 14. The tailgate panel 22 is preferably pivotally or rotatably attached to the cargo bed structure 12 by suitable mounting or connecting means 24 located adjacent the lower or bottom edge 22b to enable the desired swinging or pivoting operating movement between the open and closed positions. The exact arrangement of the tailgate panel pivot connecting means 24 is not critical to the use of the present invention as long as it enables a desired range of tailgate panel 22 movement. A suitable conventional latching mechanism having movable securing or latch pins 22e extending from side walls 22c and 22d is usually provided internally the tailgate panel 22 to be securingly received in latch openings 18a of the side wall 18. A corresponding latch opening 20a (not illustrated) may be formed in the opposite side wall 20. Such latch mechanisms are usually provided by the pickup truck V manufacturer for releasably holding or securing the tailgate panel 22 in either or both of the upstanding or horizontal positions. If such conventional latching mechanisms are provided they should be temporarily operably disabled from preventing movement of the tailgate panel 22 during use of the present invention.

The fixed upstanding or substantially vertically disposed parallel side wall panels 18 and 20 and front wall panel 16 each have a generally rectangular configuration for forming upper edges 16a, 18b and 20b. The upstanding front wall panel 16 extends between and connects with each of the side walls 18 and 20 adjacent the operator cab C. The parallel side wall 18 and 20 and front wall 16 forming panels may extend upwardly to position the upper edges 16a, 18b and 20b, a common vertical distance or height above the cargo floor panel 14, but not necessarily. Normally, but again not necessarily, the tailgate panel 22, when in the upstanding position, extends the same common vertical distance or height above the horizontal cargo carrying floor panel 14. This open top arrangement of the cargo carrying bed means 12 forms an air flow trap to increase air drag or wind resistance when the tailgate panel 22 is in the upstanding or closed position.

The apparatus 10 of the present invention provides means for adjustable positioning the tailgate panel 22 between the substantially vertical upstanding position and the substantially horizontal loading position automatically in response to the force of the air pressure on the front and back surfaces 22f and 22g of the tailgate panel 20 during forward movement of the pickup V to reduce the air drag resistances of the open top cargo bed means 12. In its simplest form or embodiment of the present invention (FIG. 4) the means for adjustably positioning includes an elongated mechanical biasing spring or urging means 28 having a first end 28a and a second end 28b. The first end 28a is operably secured or connected to the tailgate panel 22 at a suitable location usually adjacent the upper or top edge 22a. The second end 28b of the spring means 28 is secured or connected at a suitable location to the cargo bed means 12. While the illustrated form of the elongating mechanical spring 28 is preferred for simplicity, other shapes, forms or types of mechanical springs may be employed by those skilled in the art to achieve the desired result and operation. Likewise, those skilled in the art may vary the mounting arrangement for the spring 28 from that illustrated.

The spring 28 is positioned and mounted in such a manner so the tailgate panel 22 is normally maintained in the upright or closed position with a slight biasing force when the pickup truck V is stationary. As the air pressure drag on the tailgate panel 20 increases with the forward velocity or speed of the pickup V, the initial small closing urging force provided by the spring 28 is overcome and the tailgate panel 22 automatically begins to move or pivot toward the horizontal or loading position as illustrated in FIG. 1. In so doing the air pressure build up on the interior or front side surface 22f of the tailgate panel 22 is enabled to vent through the opening or gap formed between the side wall panels 18 and 20 and the side edges 22c and 22d by such automatic pivoting movement by the tailgate panel 22 for reducing the air drag. This initial increment of pivoting movement of the tailgate panel 22 also varies the orientation to the reduced air pressure drag force on the external or rearwardly facing side or back surface 22g of the tailgate panel 22. As the speed or velocity of the pickup truck V increases the tailgate panel 22 automatically continues to adjsut or move toward the horizontal position so the area of vacuum or reduced air pressure on the back side or exterior surface 22g of the tailgate panel 22 is reduced. In use, the automatic movement positioning of the tailgate panel 22 is achieved when the variable closing force of the spring 28 and the air drag forces are placed in equilibrium. In this manner the tailgate panel 22 automatically moves to adjust in air drag reducing position for different speeds of pickup truck V movement.

By choosing the elongating spring 28 with a suitable spring force constant and elastic range of enabled spring expansion movement the position of the tailgate panel 22 automatically adjusts within the movement range or limits of the tailgate panel 22 to reduce air drag. Those skilled in the art may choose to vary the spring force or elastic stretch of the spring 28 employed without departing from the present invention.

Because the desired automatic air drag reducing operation or movement of the tailgate panel 22 is similar to a conventional, commercially available automatic door closer apparatus generally designated 30, that category of well known and commercially available biasing device or means may also be adapted for use as an adjustable tailgate positioning means of the present invention. In the embodiment of the present invention illustrated in FIGS. 1-3 such an operable arrangement or embodiment using an automatic door closer apparatus 30 is disclosed. The conventional door closer apparatus 30 includes an elongated sealed housing or body 32, a pivoting operating arm or link 34 and a connecting link or mounting arm 36. The automatic door closure apparatus 30 includes an external pivoting operating arm 34 that extends outwardly from the sealed body 32 of the closure apparatus 30. One end of the pivoting operating arm 34 is operably mounted to the housing body 32 to enable the spring like biasing mechanism located in the body 32 to act on the arm 34 to provide the closing force to the pivoting arm 34 in the known manner. The internal biasing mechanism enables the connected door and arm 34 to pivot freely for enabling opening movement but applies a closing biasing force to pivot the arm 34 to close the door. The operating arm 34 is pivotally connected to the mounting arm 36 which is usually also pivotally connected to the swinging door, but in the present invention is pivotally connected to the tailgate panel 22. If desired the link 36 may be quickly disconnected from the bracket 40 on the tailgate panel 22 to temporarily disable operation of the door closure apparatus 30.

The preferred automatic door closer apparatus 30 is the series or model 500 commercially available form Parker Company of Englewood, N.J. 07631, but those commercially available from any manufacture may be suitably adapted for use.

In the illustrated embodiment, the convention door closer apparatus 30 is mounted or secured to the cargo bed means 12, but other mounting, positioning or connecting arrangements for effecting operable mounting of the door closure apparatus 30 will be apparent to those skilled in the art. The apparatus 30 is preferably mounted to the side wall panel 18 of the cargo bed means 12 using a plurality of conventional helically threaded bolts 38 (FIG. 3) so the automatic closure 30 may be easily removed when desired, but other equivalent mounting means for the closure apparatus 30 may be employed by those skilled in the art.

The operating and connecting linkage or mounting arm means 36 is pivotally connected by bracket 40 to the tailgate panel 22 and to the operating arm 34 to enable desired movement of the tailgate panel 22 between the upstanding position and the loading position. The door closer apparatus 30 contains internally within the protected body 32 a suitable conventional operating mechanism for providing a suitable closing biasing force to a door or in the present application to the tailgate panel 22. The closing biasing force is imparted internally to the operating arm 34 and then through the operating arm or link 36 to position the tailgate panel 22 in the closed or upright position (FIG. 2) while enabling automatic pivoting movement of the tailgate 22 to the open or loading position (FIG. 3) in response to the air drag forces acting on the tailgate panel 22. The door closure apparatus 30 is normally provided with an adjustable bearing or urging force for effecting closure, which the operator may employ to accommodate specific vehicle speed conditions.

Such door closer devices are also preferred embodiments as they enable the tailgate panel 22 to be easily opened with a minimum resistance force to the air drag of the tailgate panel 22 and with the closing force provided dampened or retarded to prevent a slamming return movement of the tailgate panel 22 back to the closed or upright position.

Since certain changes or modifications may be made in the disclosed embodiment without departing from the inventive concepts involved, it is the aim of the appended claims to cover all such changes and modifications falling within the true spirit and scope of the present invention.

What is claimed is:

1. An air drag reducing apparatus for a motor vehicle adapted for operably mounting an open top cargo carrying bed means having a movable tailgate closure panel to adjustably position the tailgate panel automatically in response to the air pressure resulting from forward motor vehicle movement to reduce fuel consumption, including;
    an open top cargo carrying bed means mountable on a motor vehicle for supporting a desire cargo;
    said bed means having a substantially horizontal cargo support panel and a pair of upstanding side wall panels to retain the desired cargo supported on said carrying panel;
    said bed means having a movable tailgate panel extending substantially between said side walls;
    means pivotally connecting said tailgate closure panel with said bed mens;
    said tailgate panel pivotally movable to and from an upstanding position to co-act with said upstanding side wall panels to retain the desired cargo on said carrying panel and a loading position to enable convenient placement or removal of the desired cargo on said cargo carrying panel; and
    means for adjustably positioning said tailgate panel between the upstanding position and the loading position automatically in response to the force of air pressure acting on said tailgate panel to reduce the air drag resistance of the open top cargo carrying bed means provided by forward movement of the motor vehicle.

2. The apparatus as set forth in claim 1 wherein;
    said means for adjustably positioning said tailgate panel including:
    a biasing means operably connected to said tailgate panel for providing a predetermined urging force to maintain said loading panel in the upstanding position; and
    means for operably securing said biasing means to said bed means.

3. The apparatus as set forth in claim 2 wherein said biasing means for adjustably positioning said tailgate panel, includes:
    a mechanical spring having a first end secured to said tailgate panel and a second end secured to said bed means.

4. The apparatus as set forth in claim 2, wherein said biasing means for adjustably positioning said tailgate panel, includes:
    a door closer apparatus;
    a linkage means pivotally connected to said tailgate panel and said door closure apparatus to enable movement of said tailgate panel between the upstanding position and the loading position;

* * * * *